United States Patent

Hill

Patent Number: 5,489,008
Date of Patent: Feb. 6, 1996

[54] COOLING AND LUBRICATING SYSTEM FOR NUT TREE SHAKER

[75] Inventor: Daryl G. Hill, Yakima, Wash.

[73] Assignee: Orchard-Rite Ltd., Inc., Yakima, Wash.

[21] Appl. No.: 385,437

[22] Filed: Feb. 8, 1995

[51] Int. Cl.⁶ ..................................................... F01M 1/00
[52] U.S. Cl. ............................ 184/6; 184/100; 56/340.1
[58] Field of Search ............................. 184/5, 27.1, 100, 184/6; 56/340.1

[56] References Cited

U.S. PATENT DOCUMENTS

| | | | |
|---|---|---|---|
| 3,123,965 | 3/1964 | McEwen | 56/340.1 |
| 3,178,875 | 4/1965 | McEwen | 56/340.1 |
| 4,521,468 | 6/1985 | Brandt | 56/340.1 |
| 4,757,674 | 7/1988 | Compton | 56/340.1 |
| 4,893,458 | 1/1990 | Compton | 56/340.1 |
| 4,921,073 | 5/1990 | Compton | 184/11.2 |
| 4,932,195 | 6/1990 | Compton | 56/340.1 |
| 5,103,625 | 4/1992 | McCrill | 56/340.1 |
| 5,385,006 | 1/1995 | Compton | 56/340.1 |

FOREIGN PATENT DOCUMENTS

0934973 6/1982 U.S.S.R. ................................. 56/340.1

*Primary Examiner*—Thomas E. Denion
*Attorney, Agent, or Firm*—Jacobson, Price, Holman & Stern

[57] ABSTRACT

A cooling and lubricating system incorporated into the jaws of a shaking head of a nut tree shaker in which water or a mixture of water and a lubricant is pumped from a supply reservoir through a control valve assembly into a supply line connected with a manifold bolted between the slings which support the shaker pad in each jaw for discharging water or a mixture of water and lubricant between the slings and onto the pad for cooling the slings and pads and lubricating the slings.

6 Claims, 2 Drawing Sheets

COOLING AND LUBRICATING SYSTEM FOR NUT TREE SHAKER

FIELD OF THE INVENTION

This invention relates to a cooling and lubricating system incorporated into the jaws of a shaking head of a nut tree shaker in which water or a mixture of water and a lubricant is pumped from a supply reservoir through a control valve assembly into a supply line connected with a manifold bolted between the slings which support the shaker pad in each jaw for discharging water or a mixture of water and lubricant between the slings and onto the pad for cooling the slings and pads and lubricating the slings.

BACKGROUND OF THE INVENTION

A substantial portion of a nut harvesting industry now uses a nut shaker called a "Monoboom" shaker for shaking nuts from nut trees. The nut shaker is usually mounted on a tractor with a boom section extending forwardly in the direction of travel with two shaker head support arms having sleeves pivotally and rotatably mounted on a laterally extending rod fixed to the boom section in perpendicular relation thereto. The support arms extend forwardly in the direction of travel and support a shaker head by rubber mountings. Piston and cylinder assemblies interconnect the boom section and the support arms in order to elevate the forward ends of the arms and the shaker head mounted thereon in order to position the shaker head so that a pair of jaws may grip the nut tree to be shaken. Each jaw includes a shaker pad and supporting slings mounted thereon which grip the tree. The above described structure and the manner of use of the existing nut shaker is conventional and well known.

Shaker pads and slings which support the shaker pads become quite hot from frictional heating when operating in a normal manner in view of the gripping engagement with the nut tree and relative movement between components of the shaker head including the shaker pad and slings. This problem has been alleviated by the periodic exchange of hot shaker pads for cool pads and lubricating the surfaces of the slings by the use of a lubricant which is placed on the slings when the pads are being interchanged. The replacement of the pads and greasing of the slings is required generally on an hourly basis and it requires approximately ten minutes to replace the pads, grease the slings and return the nut shaker to operative condition for another cycle.

U.S. Pat. No. 4,893,458 issued Jun. 16, 1990 for Liquid Cooled Shaker Pad Retaining Sling discloses one effort that has been made to reduce the operating temperature of the shaker pad and slings. In this patent, the sling surfaces are provided with passageways and connected with supply and return lines by which a coolant can be circulated through the sling pad structure and returned to a reservoir.

SUMMARY OF THE INVENTION

An object of the present invention is to provide a nut shaker with a cooling and lubricating system in which water or a mixture of water and a water soluble lubricant is discharged under pressure onto hot, relatively moveable surfaces to cool and lubricate those surfaces by evaporation of the coolant or coolant/lubricant mix thereby eliminating the time required to change pads and slings and eliminating the labor intensive task of applying lubricant grease to the sling surfaces.

The above object is obtained by incorporating a reservoir, pump and control valve assembly into a tractor unit on which the boom is mounted and extending a pressurized supply line along the boom to the shaker head with the supply line being connected to both of the jaws in a manner to discharge water or a mix of water and lubricant onto those surfaces having elevated temperatures while simultaneously cooling and lubricating those surfaces.

Another object of the invention is to provide a cooling and lubricating system which can be easily retrofitted into existing nut shakers or incorporated into new nut shakers with the structural components used being relatively simple and easily available and easily incorporated into a nut shaker for rendering operation of the nut shaker more efficient with less down time and less labor intensive manual greasing of the slings.

Distribution of water or a mixture of water and lubricant between the slings is obtained by the use of a hollow manifold having a pressurized supply line connected thereto and having the edges of the slings mounted from opposite surfaces of the manifold. The surface of the manifold between the slings is provided with outlet apertures for discharging flowable liquid material from the manifold to a position between the slings for cooling and lubricating the relative moveable surfaces of the slings. The inner sling is provided with a plurality of apertures which enables discharge of water or a mixture of water and lubricant though the inner sling for discharge onto the shaker pad for cooling the pad.

It is a further object of the invention to provide a hollow manifold to which the edges of the slings are attached, one to the inner surface and one to the outer surface with the manifold including an inlet connected with a pressure supply line for water or a mix of water and lubricant with the opposite edge of the manifold positioned between the adjacent edges of the slings discharging material directly between the slings for cooling and lubrication with the cooling being primarily from evaporation of the coolant.

Still another object of the invention is to provide a cooling and lubricating system in accordance with the preceding object in which the inner sling is provided with openings for enabling discharge of coolant and lubricant directly onto the shaker pad thereby reducing the operating temperature of the shaker pad via evaporation of the coolant.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENT

Figure 1:
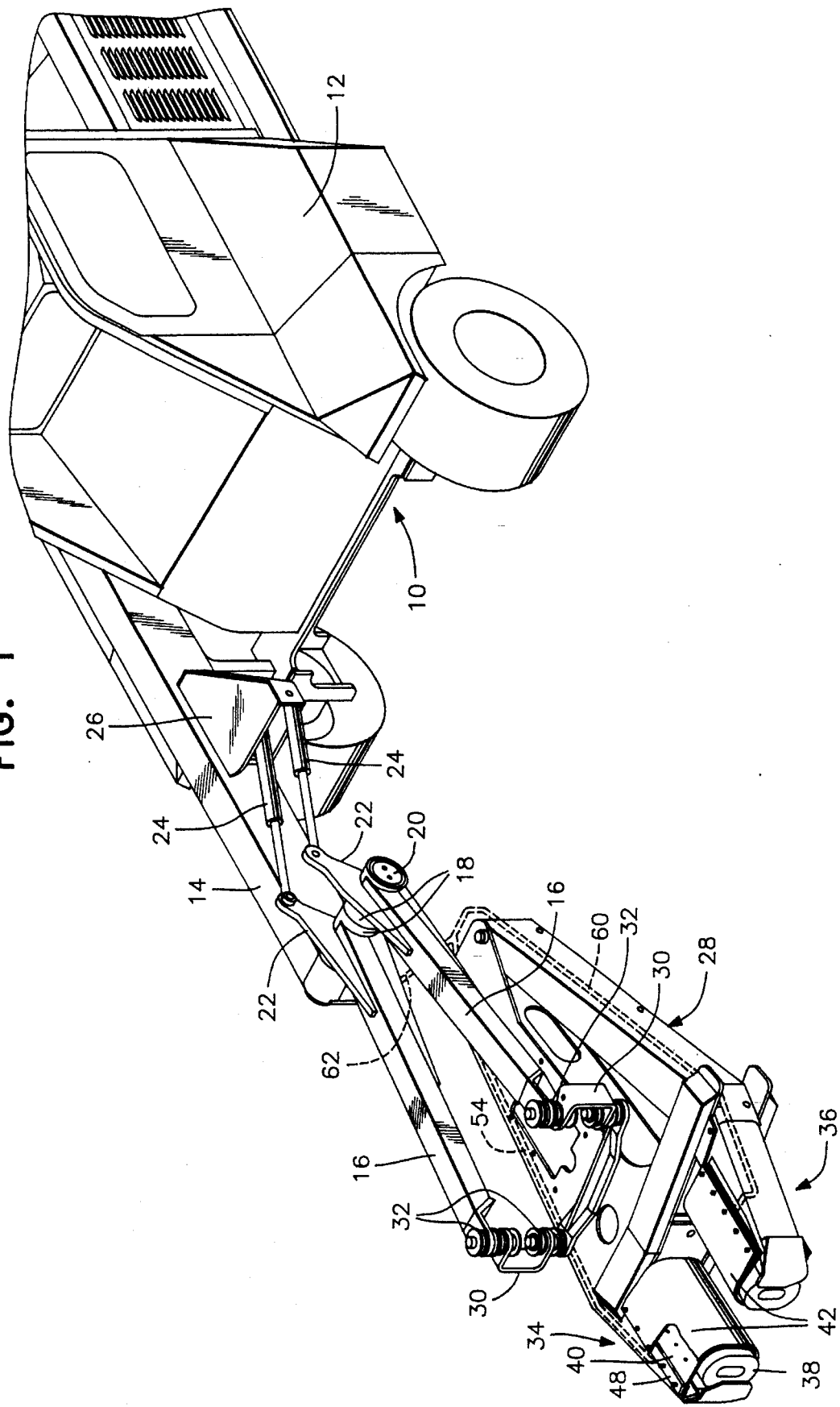
FIG. 1 is a perspective view of a nut shaker incorporating the cooling and lubricating system of the present invention therein.

In the drawings, the nut shaker to which the present invention is applied is generally designated by reference numeral 10 and includes a tractor 12 having a forwardly extending boom section 14 projecting forwardly therefrom in the direction of travel of the tractor. A pair of forwardly extending shaker head support arms 16 are mounted at the forward end of the boom section 14 by a sleeve 18 on each support arm 16 being rotatably supported on a hollow rod or arm 20 rigid with the boom section 14 and perpendicular thereto and extending inwardly toward the path of movement of the tractor in a manner well known in this art. The shaker head support arms 16 include upwardly offset end brackets 22 adjacent the hollow rod 20 with piston and cylinder assemblies 24 interconnecting the brackets 22 and a support bracket 26 on the boom section 14 to enable the support arms to be pivoted in a vertical plane about the axis of the hollow rod.

A shaker head generally designated by reference numeral 28 is supported from the forward end of the shaker head support arms 16 by C-shaped brackets 30 and rubber mounts 32.

The shaker head 28 includes a pair of jaws 34 and 36 which can be moved into clamping relationship to a nut tree (not shown) with the shaker head shaking the nut tree in a conventional manner for removing nuts from the tree so that they will fall onto the adjacent surface areas. This structure and operational technique is well known in the nut harvesting industry.

Figure 2:
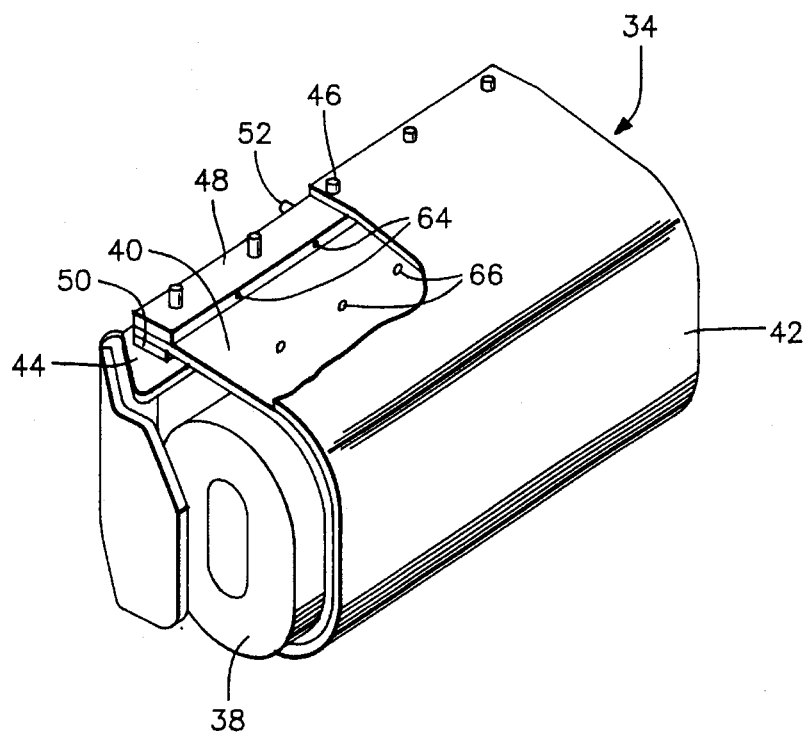
FIG. 2 is a perspective view of one of the shaker head jaws with portions broken away illustrating the structure for distributing and discharging the liquid coolant and mixture of coolant and lubricant in relation to the slings and shaking pad.
Figure 3:
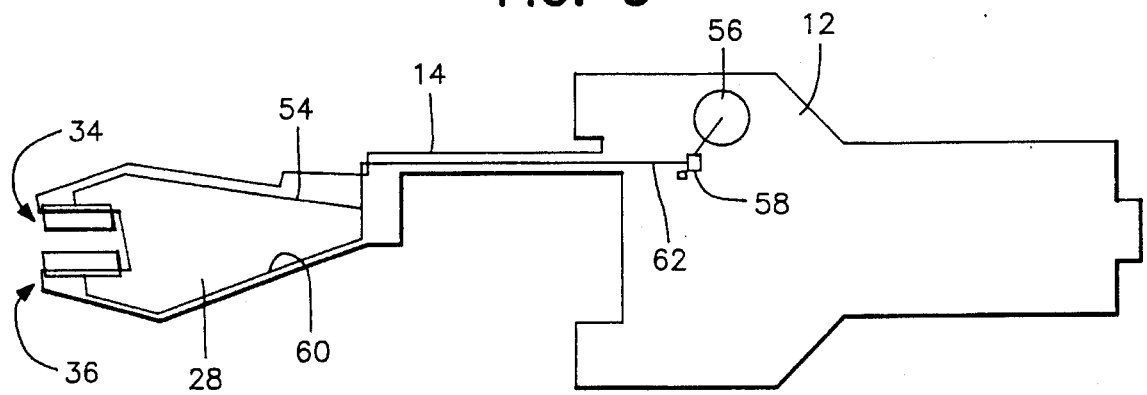
FIG. 3 is a schematic plan view illustrating the association of the cooling and lubricating system to the components of the nut shaker.

As illustrated in FIG. 2, each of the clamping and vibrating jaws 34 includes an oval shaped shaker pad 38 and a pair of slings 40 and 42 which extend partially around the shaker pad and have their edges anchored to a support structure 44 by bolts 46 extending through apertures in the slings and in a manifold 48 in the form of an elongated metal hollow plate generally the same shape and configuration as a mounting plate 50 which is connected with the supporting structure 44. The slings 40 and 42 are heavy duty sheets of rubber or similar material which produce substantial friction heat during relative movement when the slings and pads are gripping a tree during the shaking operation.

In order to remove and change the shaker pad, the bolts or other fastening means 46 must be released to enable the edges of the slings 42 and 40 to be released thereby providing access to the shaker pad for replacement and enabling the facing surfaces of the slings to be lubricated and the inner surface of the sling 40 to be lubricated by applying grease or other lubricant to those surfaces.

Forming the present invention, the plate 48 is in the form of a hollow manifold and includes an entrance port 52 connected to a conduit 54 to supply pressurized coolant and/or lubricant from a reservoir and pump assembly 56 mounted on the tractor 12 with the pressurized fluid being communicated with the conduit 54 through a valve assembly 58 to control the rate of flow and the pressure. A similar conduit 60 connects to the manifold on the opposite jaw 36. A single supply line 62 may extend from the valve assembly to the shaker head where it is connected with the supply lines 54 and 60.

It is pointed out that no return line is provided inasmuch as the liquid materials which enters the manifold 48 is discharged from holes 64 on the inner edge of the manifold 48 between the inner surface of the outer sling 42 and the outer surface of the inner sling 40 thus cooling and lubricating the facing surfaces of the slings 40 and 42.

The inner sling 40 includes a plurality of holes 66 therethrough which enables discharge of liquid coolant and/or lubricant into the interior of the sling 40 and onto the shaker pad 38 thus cooling and lubricating the shaker pad 38 as well as the slings 40 and 42.

The coolant may be water which also has lubricating characteristics or a water soluble lubricant may be added with the cooling of the slings, sling surfaces and pads being primarily due to evaporation of the coolant in order to maintain optimum operating temperature conditions for the shaker pad and slings. The introduction of lubricant reduces the friction heat produced by the shaker pads and slings thus enabling continuous operation of the nut shaker while maintaining the operating temperature of the shaker pad and slings at a desired safe operating level. This arrangement distributes a coolant or coolant and lubricant between the surfaces of the slings and interiorly of the slings onto the pad to cool the surfaces and pad by allowing the water to evaporate.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A cooling and lubricating system for a shaker pad and inner and outer slings engaging and supporting the shaker pad on a clamping jaw of a tree shaking machine, said slings having opposed, relatively movable, engaging surfaces which produce friction heat during operation of the tree shaking machine, an elongated, hollow, rigid, vertically thin manifold positioned between edge portions of said slings, said manifold having discharge means oriented between the edge portions of said slings for discharging coolant between the opposed surfaces of said slings for reducing friction heat and cooling the surfaces of the sling to a desired operating temperature during operation of the tree shaking machine, means securing said manifold and the edge portions of the slings to said jaw, said inner sling including a plurality of apertures for enabling coolant to be discharged onto the shaker pad and between the shaker pad and inner sling to reduce friction heat and the temperature of the shaker pad.

2. The system as defined in claim 1 wherein said edge portions of the slings being secured to top and bottom surfaces of the manifold, said being in an inner edge of the manifold in communication with the engaging surfaces of the slings, and means supplying pressurized coolant and lubricant to said manifold means including an inlet port in said manifold communicated with a source of pressurized coolant and lubricant.

3. The system as defined in claim 2 wherein said tree shaking machine includes a reservoir, pump and control valve for controlling flow of coolant and lubricant to said manifold, all of said coolant entering the manifold being discharged from the manifold onto the opposing engaging sling surfaces and evaporated without returning hot coolant and lubricant to the supply reservoir.

4. In a tree shaker having a pair of opposed clamp jaws, a shaker pad mounted on each of said jaws, sling assemblies supporting said pads on said jaws, each sling assembly including an inner sling engaged with said pad and an outer sling engaging an outer surface of said inner sling, each of said slings being flexible, means mounting edge portions of said slings to said jaw, a hollow rigid manifold positioned between the mounted edge portions of said slings, said manifold including an inlet communicated with a source of pressurized coolant/lubricant, and discharge means in a portion of the manifold communicating with the engaging surfaces of said slings for cooling/lubricating the engaging surfaces of the slings, said outer sling being imperforate, said inner sling including means enabling passage of coolant/lubricant therethrough to contact said pad for cooling/lubricating said pad.

5. The tree shaker as defined in claim 4 wherein said means enabling passage of coolant/lubricant through the inner sling includes a plurality of apertures extending through said inner sling.

6. The tree shaker as defined in claim 5 wherein said discharge means includes a plurality of apertures in an inner edge portion of said manifold for discharging coolant/lubricant between said slings adjacent the mounted edge portions of said slings.

* * * * *